United States Patent [19]

Ishibashi et al.

[11] 4,115,131

[45] Sep. 19, 1978

[54] OPTICAL GLASS

[75] Inventors: Kazufumi Ishibashi, Sagamihara; Takeo Ichimura, Tokyo, both of Japan

[73] Assignee: Nippon Kogaku K.K., Tokyo, Japan

[21] Appl. No.: 791,182

[22] Filed: Apr. 27, 1977

[30] Foreign Application Priority Data

Apr. 30, 1976 [JP] Japan .................. 51-48474

[51] Int. Cl.² .......................... C03C 3/16; C03C 3/14
[52] U.S. Cl. ................................. 106/47 Q
[58] Field of Search ..................... 106/47 Q

[56] References Cited

U.S. PATENT DOCUMENTS

| | | | |
|---|---|---|---|
| 3,836,375 | 9/1974 | Broemer et al. | 106/47 Q |
| 3,877,953 | 4/1975 | Broemer et al. | 106/47 Q |
| 3,954,484 | 5/1976 | Broemer et al. | 106/47 Q |
| 3,979,322 | 9/1976 | Alexev et al. | 106/47 Q |

*Primary Examiner*—O. R. Vertiz
*Assistant Examiner*—Mark Bell
*Attorney, Agent, or Firm*—Shapiro and Shapiro

[57] ABSTRACT

A composition for optical glass having a refractive index from 1.57 to 1.98 and Abbe number from 18 to 46 comprises, by weight, 1 to 25% $B_2O_3$, 20 to 50% $P_2O_5$ and 22 to 70% $Nb_2O_5$.

11 Claims, 2 Drawing Figures

OPTICAL GLASS

BACKGROUND OF THE INVENTION

1. Field of the Invention

This invention relates to compositions for optical glass having high refractive index and high dispersion.

2. Description of the Prior Art

Among the optical glasses of high refractive index and high dispersion, some fall within the category usually called flint glass, bi-flint glass, barium flint glass, bi-barium flint glass, antimony flint glass, etc. These glasses chiefly contain silicic acid or boracic acid as the glass network forming oxide; they contain alkali metal oxide, alkali earth metal oxide, zinc oxide, lead oxide, antimony oxide, titanium oxide or the like as the glass network modifying oxide, and aluminum oxide as the intermediate oxide. These optical glasses have been widely used as the indispensable materials for the elements constituting an optical system; but they are not always adequate for transmissivity to light rays and chemical durability. This is particularly true with regard to optical glasses which are high in refractive index and low in silicic acid content.

Recently, along with the popularization of color photography, the requirement for the suitable transmissivity of optical glasses to light rays has become so essential that the yellowish color peculiar to the optical glasses falling within the described category has come to be regarded as a more serious limitation than ever before. Also, advanced polishing techniques for optical glasses have often caused the glass materials to be subjected to unusually severe machining conditions. Moreover, as multilayer coatings have come into wide usage, surface layer alteration due to corrosion has become unacceptable and thus, the property of chemical durability has become most important.

SUMMARY OF THE INVENTION

The present invention has, for its object, to provide compositions for optical glass of high refractive index and high dispersion which are high in transmissivity to light rays, which furnish excellent chemical durability, and which provide optical glasses that are industrially stable.

Compositions for optical glasses according to the present invention contain, by weight, approximately 1 to 25% $B_2O_3$, approximately 20 to 50% $P_2O_5$, and approximately 22 to 70% $Nb_2O_5$. The optical constants of this optical glass are such that the refractive index nd ranges from 1.57 to 1.98 and the Abbe number $\nu$d ranges from 18 to 46.

The invention will become more fully apparent from the following detailed description of various embodiments thereof taken in conjunction with the accompanying drawings.

DESCRIPTION OF THE PREFERRED EMBODIMENTS

Figure 1:
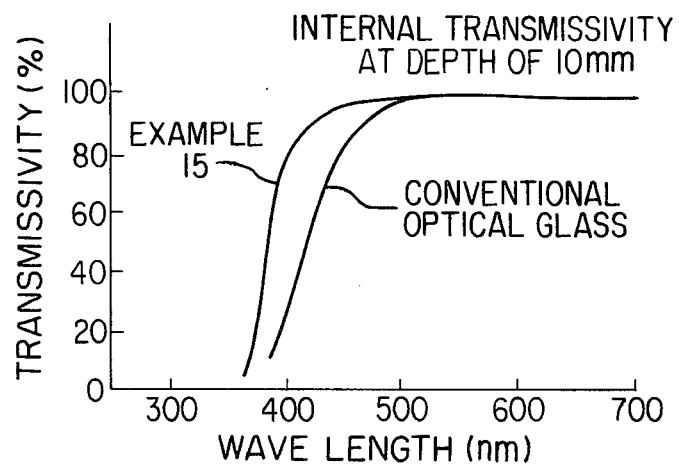
FIGS. 1 and 2 graphically illustrate the internal transmissivity of optical glasses according to the present invention and of optical glasses according to the prior art.

Throughout the ensuing description, the percentages appearing therein are all by weight.

$B_2O_3$ and $P_2O_5$ are widely used as the glass network forming oxides, and $Nb_2O_5$ is one of the most useful materials as the network modifying oxide which imparts a high refractive property to glass. The optical glass according to the present invention contains these three components only, or contains them as the chief components.

$P_2O_5$ has the capability of forming phosphate glass by being molten at a lower temperature than $SiO_2$ or $B_2O_3$ usually used as the network forming oxide in silicate or borosilicate glass; also $P_2O_5$ furnishes high transmissivity to light rays from the visible range to the range near the ultraviolet. $Nb_2O_5$ is an oxide which imparts a high refractive index and relatively high dispersion, and this oxide enhances chemical durability. However, in the prior art glasses the range within which $Nb_2O_5$ could be contained in the glasses has been relatively narrow, and accordingly, the use of $Nb_2O_5$ has been very limited.

In accordance with the present invention, $B_2O_3$ as the glass network forming oxide is used with $P_2O_5$ in such appropriate proportions that it has become possible to widely enlarge the vitrification range and to maintain such range stable, while enabling a very substantial widening of the $Nb_2O_5$ content. Also, production of optical glass having both the characteristic of phosphate glass which has a high transmissivity to light rays and the characteristic of $Nb_2O_5$ containing glass which has a high refractive index and high chemical durability has become possible over a wide range of optical constants.

In this manner, the use of only three basic components, $B_2O_3$ - $P_2O_5$ - $Nb_2O_5$, enables the production of stable optical glass over a considerable range. Nevertheless, the addition of other components is permissible to further enhance the range of the optical constants of the glass. The addition of an appropriate quantity of another component or components will not only result in the attainment of appropriate optical constants, but the melting point the composition may be reduced to reduce the risk of the glass being contaminated or colored by the erosion of the crucible.

The features of the glass produced with various components added will now be described more specifically. Such additives may include alkali metal oxides. One or more of $Na_2O$, $K_2O$ and $Li_2O$, if added, will broaden the vitrification range and reduce the liquid phase temperature to a greater extent than where only the three basic components are used, thus making it possible to produce glass having a wider range of optical constants. Devitrification will also be reduced to decrease the melting temperature, thus reducing the risk of the glass being colored by the erosion of the crucible during melting. However, if the additive or additives exceed significant amounts, the devitrification property will be increased and the chemical durability will be reduced. of the above-mentioned alkali metal oxides, the addition of $K_2O$ furnishes the most conspicuous efficiency of broadening the vitrification range and reducing the liquid phase temperature. The quantity of the alkali metal oxide to be added where necessary is 1 to 31% in total for one or more of the additives. Further, in this instance, if $Nb_2O_5$ is maintained at at least 30%, the resultant optical glass possesses excellent chemical durability.

Next, by adding an alkaline earth metal oxide, zinc oxide or lead oxide to the four-component system of $B_2O_3$ - $P_2O_5$ - $Nb_2O_5$ - $R_2'O$ ($R_2'O$ is one or more of $Li_2O$, $Na_2O$ and $K_2O$), it is possible to enlarge the range of optical constants of the glass, afford a stable vitrification range, and reduce the risk of the glass being colored. Alkaline earth metal oxides, for example, MgO, CaO, SrO, BaO and ZnO impart to the glass a modest Abbe number for the refractive index, and PbO imparts a small Abbe number for the refractive index. Therefore, if one or more of these components are added to the four-component system of $B_2O_3$ - $P_2O_5$ - $Nb_2O_5$ - $R_2^IO$, an optical glass is produced having a modest or small range of Abbe number and a wide range of refractive index. CaO and MgO each has the property of reducing the specific gravity of glass, and the glasses produced with a great deal of such material contained therein are very much lower in specific gravity than the conventional optical glasses. Such glasses can therefore greatly contribute to the reduction in weight of an optical system. The quantity of alkali earth metal oxide, zinc oxide and lead oxide to be added where necessary is 1 to 33% in total for one or more of them. In this instance, if at least 16% of PbO is included, the resultant optical glass will have a refractive index nd of 1.80 or greater, and if one of both of MgO and CaO is included in an amount of 6 to 16%, the resultant optical glass will have a low specific gravity.

By adding $TiO_2$ to the five-component system of $B_2O_3$ - $P_2O_5$ - $Nb_2O_5$ - $R_2^IO$ - $R^{II}O$ ($R^{II}O$ is one or more of MgO, CaO, SrO, BaO, ZnO and PbO), a stable optical glass is produced having a high refractive index and a low Abbe number. $TiO_2$, like $Nb_2O_5$, imparts a high refractive index to the glass. Thus, by $TiO_2$ being added, the resultant glass has a high refractive index even if the $Nb_2O_5$ content is reduced, and this leads to reduction in the liquid phase temperature, the result of which is that glass having a high refractive index can be produced which is stable against devitrification.

The glass with $TiO_2$ added as excellent chemical durability and little lessening in transmissivity to the light rays. When the $TiO_2$ content is substantially increased, the glass is often colored purple according to the condition to be molten. An adequate addition of $As_2O_3$ to be molten can avoid such coloring. It is desired that the environment be made acidic. The quantity of $TiO_2$ to be added where necessary is 1 to 18%.

In order to obtain stable glass having a high refractive index and a low Abbe number, it is sometimes preferable to add $GeO_2$ to the above-mentioned six-component system. $GeO_2$ itself is a glass network forming oxide, and therefore, if added in an appropriate quantity, it would be highly effective to the stabilization of the glass. As for $GeO_2$, if it is substituted for part of $B_2O_3$ or $P_2O_5$, the refractive index of the resultant glass will become higher while the Abbe number thereof will become lower, thus enabling production of a glass having a high refractive index and high dispersion. The quantity of $GeO_2$ to be added where necessary is 1 to 19%.

In order to obtain stable glass of high refractive index and low Abbe number, it is sometimes preferable to add $WO_3$ to the above-mentioned seven-component system. $WO_3$ imparts a high refractive index to the glass to the same extent as does $TiO_2$. Thus, when $WO_3$ is added, glass having a high refractive index may be obtained even if the $Nb_2O_5$ content is decreased, and therefore, the liquid phase temperature may be reduced to enable glass having a high refractive index to be produced which is stable against devitrification. The quantity of $WO_3$ to be added where necessary is 1 to 21%.

Besides the above-mentioned substances, $Al_2O_3$, $Y_2O_3$, $ZrO_2$, F, $As_2O_5$ or $Ta_2O_5$ may be added in suitable quantity to thereby provide optical glass which is excellent in chemical durability and transmissivity to light rays within a wide range of refractive index. The addition of a rare earth element oxide is not preferable in that it increases the liquid phase temperature, but a slight quantity of such substance might be added to improve the optical properties of the glass.

The upper and lower limits of the acceptable amounts for each component have been determined for the following reasons.

$B_2O_3$, if less than 1%, results in instability against devitrification and, if greater than 25%, produces emulsion. $P_2O_5$, if less than 20%, results in instability against devitrification and, if greater than 50%, prevents the refractive index from becoming sufficiently high and also reduces the chemical durability. $Nb_2O_5$, if less than 22%, aggravates the chemical durability and reduces the refractive index and, if greater than 70%, results in instability against devitrification. $R_2^IO$, where necessary and if less than 1%, results in no effect and, if greater than 31%, results in instability against devitrification. $R^{II}O$, where necessary and if less than 1%, results in no effect and, if greater than 33%, results in instability against devitrification. $TiO_2$, where necessary and if less than 1%, results in no effect and, if greater than 18%, results in instability against devitrification. $GeO_2$, where necessary and if less than 1%, results in no effect and, if greater than 19%, increases the melting temperature of the glass and induces devitrification. $WO_3$, where necessary and if less than 1%, results in no effect and, if greater than 21%, results in instability against devitrification.

The optical glass according to the present invention employs the following substances for the various components: for $P_2O_5$, a water solution of $H_3PO_4$ or phosphate of other composition, such as potassium metaphosphate or the like; and for the other components, a corresponding oxide, carbonate, nitrate, fluoride, etc.; if required, a defoaming agent such as arsenious acid or the like or an achromatic agent may be added to prepare a mixture of predetermined ratio and such mixture may be placed in a platinum crucible within an electric furnace heated to 950°–1350° C. until it is melted and refined, following which the mixture is stirred and homogenized and then cast into an iron mold and gradually cooled down to produce the glass. Fluorine is introduced as a fluoride having a component of positive ions.

Compositions (percent by weight), refractive indices nd and Abbe numbers νd of various examples of the optical glass according to the present invention are shown in Table 1 which follows. The composition in Example 27 is expressed in the percentage by weight of the oxides as calculated with the positive ions in the glass being regarded as the oxides, and with part of oxygen ions being substituted for by the fluorine ions indicated.

Figure 2:
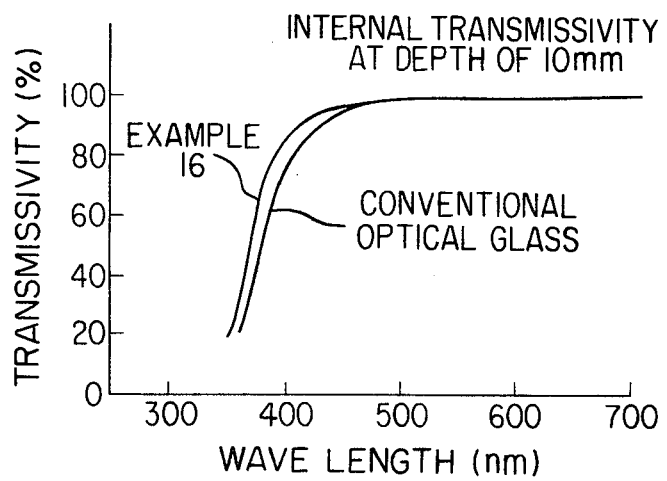

FIGS. 1 and 2 graphically illustrate the internal transmissivity of the glasses according to Examples 15 and 16 and of the conventional optical glasses having the same refractive indices nd and Abbe numbers νd as those of the glasses according to these Examples. The internal transmissivity curves shown there are those at a depth of 10mm. It will be seen from these graphs that the optical glasses of the present invention are superior in transmissivity to light rays, especially of short wave and long side.

Table 2 which follows shows comparatively the acid resistivity, which provides the standard for chemical durability, of the glasses according to Examples 15 and 16 and of the conventional glasses having the same refractive indices nd and Abbe numbers νd as those of the glasses according to these Examples. The acid resistivity was measured by maintaining mass as same as specific gravity of powdered glass having a size of 420 to 590 μm within nitric acid of 0.01N at 100° C. for 60 minutes and by calculating the rate of weight reduction (percent by weight) from the weight of the sample and its reduction in weight. Glasses having lower rates of weight reduction (percent by weight) are better in chemical durability, and it is apparent from Table 2 that the optical glasses according to the present invention are superior.

Table 2

| | Chemical Durability |
|---|---|
| | Acid Resistivity |
| Example 15 | 0.005% |
| Conventional Optical Glass | 0.682% |
| Example 16 | 0.02% |
| Conventional Optical Glass | 0.33% |

Where the optical glass according to the present invention is used for the lenses of spectacles, it is possible to add, individually or in combination, a slight quantity of coloring agent such as $Nd_2O_3$, $Fe_2O_3$, $Cr_2O_3$, $Ni_2O_3$, $Pr_6O_{11}$, CuO or the like.

According to the present invention, optical glass of high refractive index and high dispersion may be produced which is industrially stable, has a high transmis- Table 1.

| | 1 | 2 | 3 | 4 | 5 | 6 | 7 | 8 | 9 |
|---|---|---|---|---|---|---|---|---|---|
| $B_2O_3$ | 24.48 | 13.87 | 14.10 | 13.64 | 21.55 | 8.80 | 13.44 | 2.97 | 8.72 |
| $P_2O_5$ | 44.37 | 28.09 | 28.57 | 27.62 | 31.75 | 28.10 | 27.24 | 20.38 | 49.75 |
| $Nb_2O_5$ | 31.15 | 43.69 | 44.43 | 42.96 | 26.93 | 34.31 | 42.36 | 69.68 | 23.99 |
| $Li_2O$ | — | 1.14 | 2.27 | — | — | — | — | — | — |
| $Na_2O$ | — | 1.37 | — | 2.73 | — | — | — | — | — |
| $K_2O$ | — | 11.84 | 10.63 | 13.05 | 19.77 | 28.79 | 16.96 | 6.97 | 17.54 |
| nd | 1.6549 | 1.7178 | 1.7270 | 1.7086 | 1.6063 | 1.6342 | 1.6988 | 1.9701 | 1.5775 |
| νd | 36.6 | 28.4 | 27.7 | 29.0 | 40.4 | 35.1 | 29.1 | 18.0 | 45.7 |

| | 10 | 11 | 12 | 13 | 14 | 15 | 16 | 17 | 18 |
|---|---|---|---|---|---|---|---|---|---|
| $B_2O_3$ | 7.26 | 9.07 | 10.45 | 10.32 | 9.30 | 7.08 | 8.98 | 7.38 | 6.14 |
| $P_2O_5$ | 25.88 | 30.04 | 33.64 | 34.20 | 35.00 | 23.45 | 29.76 | 24.44 | 27.21 |
| $Nb_2O_5$ | 38.74 | 23.73 | 23.95 | 34.62 | 33.03 | 35.67 | 41.15 | 25.35 | 24.15 |
| $K_2O$ | 8.29 | 9.00 | 11.41 | 6.84 | 7.00 | 9.29 | 13.24 | 5.49 | 7.42 |
| MgO | 0.77 | 1.99 | 3.63 | 6.70 | 7.41 | — | 2.81 | — | — |
| CaO | 1.18 | 2.73 | 5.05 | 7.32 | 8.26 | — | 4.06 | — | — |
| SrO | 0.42 | 6.55 | 7.47 | — | — | — | — | — | — |
| BaO | 1.60 | — | — | — | — | — | — | — | — |
| ZnO | 0.31 | 2.38 | 4.40 | — | — | — | — | — | — |
| PbO | 15.55 | 14.51 | — | — | — | 24.51 | — | 32.64 | 16.32 |
| $TiO_2$ | — | — | — | — | — | — | — | 4.70 | 17.84 |
| $GeO_2$ | — | — | — | — | — | — | — | — | — |
| $As_2O_3$ | — | — | — | — | — | — | — | — | 0.92 |
| nd | 1.7875 | 1.7178 | 1.6538 | 1.7009 | 1.6946 | 1.8052 | 1.7174 | 1.8303 | 1.8039 |
| νd | 26.7 | 36.9 | 38.7 | 32.5 | 33.6 | 25.5 | 29.5 | 24.0 | 22.3 |

| | 19 | 20 | 21 | 22 | 23 |
|---|---|---|---|---|---|
| $B_2O_3$ | 1.90 | 2.87 | 4.66 | 6.03 | 8.86 |
| $P_2O_5$ | 22.53 | 26.80 | 23.28 | 28.49 | 28.27 |
| $Nb_2O_5$ | 33.27 | 23.84 | 22.78 | 52.50 | 30.45 |
| $Na_2O$ | — | — | — | 6.19 | — |
| $K_2O$ | 6.71 | 13.04 | 9.34 | — | 28.97 |
| PbO | 26.29 | 13.15 | 13.09 | — | — |
| $TiO_2$ | 1.94 | 1.47 | 2.47 | 4.38 | — |
| $GeO_2$ | 7.36 | 18.83 | 3.68 | — | — |
| $WO_3$ | — | — | 20.70 | — | — |
| $Al_2O_3$ | — | — | — | 2.41 | — |
| $Y_2O_3$ | — | — | — | — | 3.45 |
| $ZrO_2$ | — | — | — | — | — |
| $As_2O_5$ | — | — | — | — | — |
| $Ta_2O_5$ | — | — | — | — | — |
| F | — | — | — | — | — |
| $La_2O_3$ | — | — | — | — | — |
| nd | 1.8455 | 1.7262 | 1.7730 | 1.8435 | 1.6278 |
| νd | 24.0 | 34.2 | 26.7 | 22.1 | 36.5 |

| | 24 | 25 | 26 | 27 |
|---|---|---|---|---|
| $B_2O_3$ | 9.42 | 8.58 | 13.80 | 7.40 |
| $P_2O_5$ | 30.05 | 27.37 | 27.98 | 24.00 |
| $Nb_2O_5$ | 23.74 | 29.48 | 23.72 | 54.31 |
| $Na_2O$ | — | — | — | — |
| $K_2O$ | 30.79 | 28.04 | 17.41 | 13.45 |
| PbO | — | — | — | — |
| $TiO_2$ | — | — | — | — |
| $GeO_2$ | — | — | — | — |
| $WO_3$ | — | — | — | — |
| $Al_2O_3$ | — | — | — | 0.84 |
| $Y_2O_3$ | — | — | — | — |
| $ZrO_2$ | 6.00 | — | — | — |
| $As_2O_5$ | — | — | 17.09 | — |
| $Ta_2O_5$ | — | 6.53 | — | — |
| F | — | — | — | 0.95 |
| $La_2O_3$ | — | — | — | — |
| nd | 1.6183 | 1.6360 | 1.6226 | 1.8013 |
| νd | 38.4 | 35.2 | 39.8 | 23.2 | sion factor to light rays, and which possesses excellent chemical durability.

What is claimed is:

1. An optical glass composition having a refractive index from 1.57 to 1.98 and Abbe number from 18 to 46, said composition consisting essentially of, by weight, 1 to 25% $B_2O_3$, 20 to 50% $P_2O_5$, and 22 to 70% $Nb_2O_5$.

2. A composition according to claim 1, including, by weight, 1 to 31% $R_2^IO$ where $R_2^IO$ is one or more of $Li_2O$, $Na_2O$ and $K_2O$.

3. A composition according to claim 2, including, by weight, 1 to 33% $R^{II}O$ where $R^{II}O$ is one or more of MgO, CaO, SrO, BaO, ZnO and PbO.

4. A composition according to claim 3, including, by weight, 1 to 18% $TiO_2$.

5. A composition according to claim 4, including, by weight, 1 to 19% $GeO_2$.

6. A composition according to claim 5, including, by weight, 1 to 21% $WO_3$.

7. A composition according to claim 2, comprising, by weight, 1 to 25% $B_2O_3$, 20 to 50% $P_2O_5$, 30 to 70% $Nb_2O_5$, and 1 to 31% $R_2^IO$ where $R_2^IO$ is one or more of $Li_2O$, $Na_2O$ and $K_2O$.

8. A composition according to claim 7, including, by weight, 6 to 16% of one or both of MgO and CaO.

9. A composition according to claim 7, including, by weight, 16 to 33% PbO.

10. A composition according to claim 3, including, by weight, 10.32% $B_2O_3$, 34.20% $P_2O_5$, 34.62% $Nb_2O_5$, 6.84% $K_2O$, 6.70% MgO, and 7.32% CaO.

11. A composition according to claim 3, including, by weight, 7.08% $B_2O_3$, 23.45% $P_2O_5$, 35.67% $Nb_2O_5$, 9.29% $K_2O$, and 24.51% PbO.

* * * * *